(12) United States Patent
Brunet-Manquat

(10) Patent No.: US 6,792,865 B2
(45) Date of Patent: Sep. 21, 2004

(54) METHOD AND APPARATUS FOR PRINTING ON A FLAT SUBSTRATE

(75) Inventor: Francis Brunet-Manquat, Villeurbanne (FR)

(73) Assignee: Ateliers A.S., Pierre Benite (FR)

( * ) Notice: Subject to any disclaimer, the term of this patent is extended or adjusted under 35 U.S.C. 154(b) by 0 days.

(21) Appl. No.: 10/257,683

(22) PCT Filed: Mar. 30, 2001

(86) PCT No.: PCT/FR01/00970

§ 371 (c)(1), (2), (4) Date: Oct. 24, 2002

(87) PCT Pub. No.: WO01/78992

PCT Pub. Date: Oct. 25, 2001

(65) Prior Publication Data

US 2003/0110969 A1 Jun. 19, 2003

(30) Foreign Application Priority Data

Apr. 18, 2000 (FR) .............................. 00 05001

(51) Int. Cl.$^7$ ............................ B41M 1/12; B41F 1/34; B41F 31/02; G41F 15/00
(52) U.S. Cl. ...................... 101/485; 101/129; 101/365; 358/1.9
(58) Field of Search ................................ 101/485, 129, 101/151, 171, 115, 365; 358/1-9, 497

(56) References Cited

U.S. PATENT DOCUMENTS

| | | | |
|---|---|---|---|
| 5,095,835 A | * | 3/1992 | Jernigan et al. ....... 112/475.05 |
| 5,509,086 A | * | 4/1996 | Edgar et al. ................. 382/167 |
| 5,574,829 A | * | 11/1996 | Wallace et al. .............. 358/1.1 |
| 5,767,980 A | * | 6/1998 | Wang et al. ................. 358/475 |
| 5,812,705 A | * | 9/1998 | Wang et al. ................. 382/294 |
| 5,841,955 A | * | 11/1998 | Wang ......................... 358/1.9 |
| 5,895,073 A | * | 4/1999 | Moore ......................... 283/70 |
| 5,899,143 A | | 5/1999 | Niestrath et al. ........... 101/129 |
| 5,903,712 A | * | 5/1999 | Wang et al. ................. 358/1.9 |
| 6,002,847 A | * | 12/1999 | Silverbrook ............... 358/1.17 |
| 6,028,682 A | * | 2/2000 | Ott et al. .................... 358/497 |
| 6,380,539 B1 | * | 4/2002 | Edgar .................... 250/339.05 |
| 6,389,968 B1 | * | 5/2002 | Sugimoto et al. .......... 101/365 |
| 6,442,301 B1 | * | 8/2002 | Edgar ......................... 382/275 |

FOREIGN PATENT DOCUMENTS

| | | |
|---|---|---|
| DE | 39 17 957 A1 | 12/1990 |
| EP | 0 461 796 A1 | 12/1991 |
| EP | 0 554 811 A1 | 8/1993 |
| EP | 0 732 440 A1 | 9/1996 |
| EP | 0 795 400 A1 | 9/1997 |

\* cited by examiner

*Primary Examiner*—Andrew H. Hirshfeld
*Assistant Examiner*—Wasseem H. Hamdan
(74) *Attorney, Agent, or Firm*—Oliff & Berridge, PLC

(57) ABSTRACT

The invention concerns an assembly for printing on a substrate having a camera for recording a reference pattern; a computer connected to said camera to store and modify, if required, data (N) concerning the reference pattern; and a printer whereof at least the print head is controlled by a printer file (FI) generated by the computer. The invention is characterised in that it includes a system for supporting and moving the substrate; for analysing and comparing a pre-recorded pattern with a pattern located on the substrate, and for adapting or not the data (N) concerning the reference pattern as a result of the comparison; and for generating a printer file (FI) based on the data whether or not modified.

20 Claims, 4 Drawing Sheets

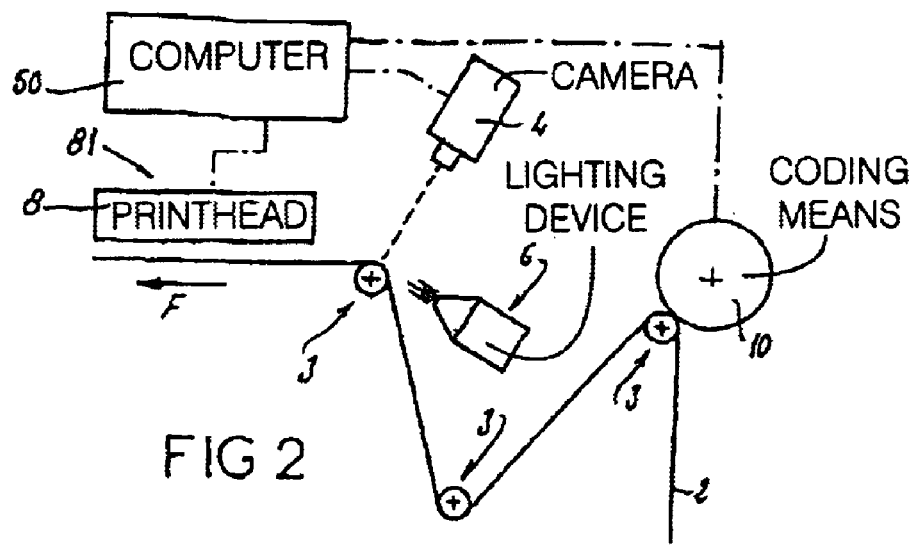
FIG 2
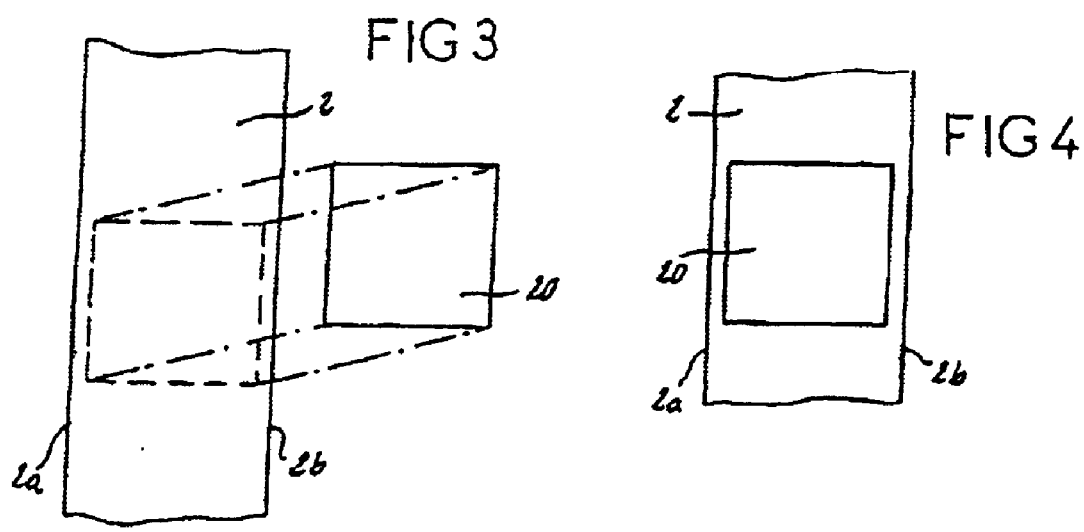
FIG 3
FIG 4

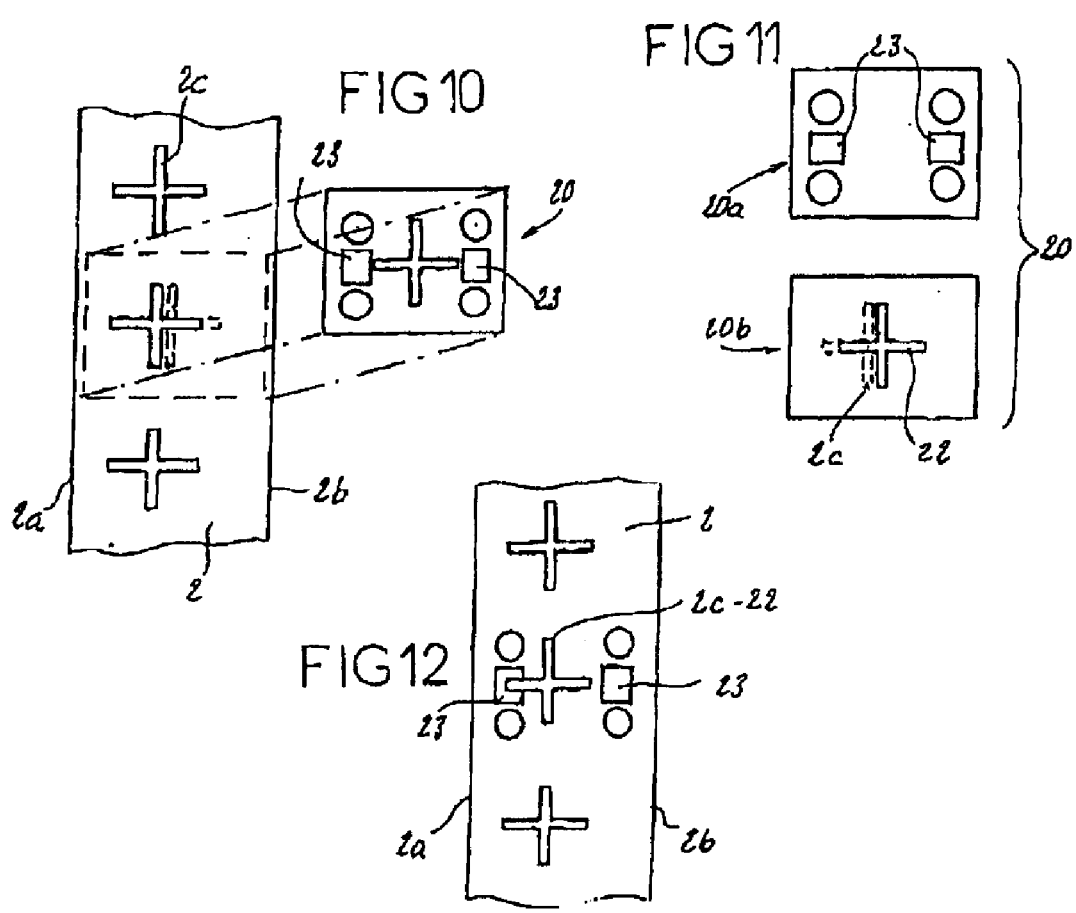

METHOD AND APPARATUS FOR PRINTING ON A FLAT SUBSTRATE

BACKGROUND OF THE INVENTION

The present invention relates to the general technical field of printing on a flat substrate, for example a fabric, by reference to which the present invention will be introduced, discussed and exemplified.

By "fabric" is meant generically any woven or nonwoven cloth.

The invention is concerned more particularly with printing on a fabric of the "jacquard" type. Such printing must make it possible to print an image, a design or colors on a figured pattern pre-existing in the fabric.

In all the description and the claims below, the term "pattern" in the singular designates a unitary or single pattern or one which is repeated in at least one direction or dimension of the flat substrate, for example of the fabric, and a set of patterns identical or different from one another.

Patterns of the "jacquard" type are produced by different ways of interlacing the threads, thus giving said patterns their form, their contour and a surface or textured appearance, with some contrast. The patterns are therefore figured directly in the fabric.

Traditional printing, known as "flat-screen" printing, is defined as being printing in which a printing screen is used. The latter has a cutout according to the form of a pattern.

A mask is a band of greater or lesser length which is arranged on the fabric and is provided with cut-out patterns.

Printing known as "double-stencil" printing is defined as being printing in which a printing screen is superposed on a mask, in order to carry out screen printing.

Printing methods are known which involve accurately fastening a fabric to a table and manufacturing very expensive printing screens which are arranged successively on the fabric, so as to produce prints through said screens in a way in register with the figured patterns of the fabric. Such a method requires considerable human resources in order to position the fabric and/or the printing screens. The fastening of the fabric to a table is a very time-consuming manual operation.

Such a method assumes the use of fixed-form screens which do not make it possible to obtain high accuracy. An accuracy of the order of a centimeter is obtained, which may represent an appreciable offset during printing.

It is also known, from the document DE 3 917 957, to employ a method for printing a fabric with designs and/or colors, which involves:

pre-recording a pattern with the aid of a camera or computer;

where appropriate, processing the pre-recorded pattern;

and generating a printing file comprising data relating to the pre-recorded and/or processed pattern, so as to control the printing from a printer connected to the computer. The fabric is thus printed with the patterns pre-recorded in the computer, for example repetitively.

This method does not make it possible to identify and recognize a pre-existing pattern in the fabric.

Moreover, such a method, by its very conception, is independent of the structure of the fabric and, more specifically, of any distortion of the pattern figured in the fabric. There is no provision for adapting to the pattern figured in the fabric.

The document EP 0 795 400 relates to a printing method for printing a substrate, in this particular case paper. This method involves pre-recording at least one pattern numerically, generating a printing file comprising data relating to the pre-recorded pattern and carrying out printing generated directly or indirectly from the printing file.

Reference patterns are recognized, using a shade separation technique. This technique is implemented by successively generating elementary images corresponding to shades or to superpositions of particular shades. The elementary images, obtained by means of screens, cylinders or printing presses, are positioned in relation to one another in order to come as closely as possible to the pre-recorded reference patterns.

The various shades, applied in successive layers, are therefore repositioned in relation to one another in order to obtain the final image. Moreover, repositioning is controlled by means of a comparison between a reference image and the actual printed image resulting from a printing test.

For processing purposes, this method allows only a relative displacement between fixed or unchangeable images.

The method is implemented in a printing technique, not by the continuous printing of a fabric, on which it is necessary to identify, analyze and process a pattern integrated into the substrate, said pattern not necessarily being repeated identically in its form and/or its position on the substrate.

This method does not make it possible to modify the geometry of a pattern substantially in the measurement or the paper printing press used does not make it possible to set the relative positioning of elementary shades.

BRIEF SUMMARY OF THE INVENTION

The essential object of the present invention is a method making it possible to print any pattern on a flat substrate, for example a fabric, in a recorded or identified manner with respect to any pre-existing pattern on said fabric, and, in particular, any figured pattern.

According to the invention, the printing method involves:

continuously or discontinuously identifying at least one pattern of a fabric by relative displacement between said fabric and an image acquisition means;

comparing the identified pattern in real time with a reference pattern pre-recorded for recognition purposes;

adapting the pre-recorded reference pattern in line, in order to superpose it on and/or fit it to the identified pattern, and generating a printing file;

and carrying out printing dot by dot, directly or indirectly, according to the printing file.

The objects assigned to the present invention are also achieved with the aid of a "computer program" product loadable directly into the internal memory of a computer and comprising software code portions for executing the steps of the method described below, when said program is executed on a computer.

The present invention also relates to an assembly for printing on a substrate, comprising:

a camera for recording a reference pattern;

a computer connected to said camera, in order to store and, where appropriate, modify data relating to the reference pattern;

and a printer, of which at least one head for printing dot by dot is controlled by a printing file generated by the computer.

According to invention, the printing assembly comprises:
a means for the support and movement of the substrate;
analysis means in order, on the one hand, to compare a pre-recorded reference pattern in real time with a pattern identified on the substrate, and, on the other hand, to adapt or not the data relating to the reference pattern as a function of the result of the comparison;
and means for generating a printing file from the data modified or not.

The method according to the present invention has the advantage of making it possible to print fabrics for which it is not possible to recognize by transparency patterns which are figured in said fabric.

Another advantage is linked to the automation of the printing operations and, in particular, the identification of the patterns figured in the fabric.

This automation also relates to the printing operation per se which may be carried out directly from pre-recorded instructions. The printing method according to the invention makes it possible to carry out detailed work automatically, in line, on the form of the images to be printed, in order to obtain an accurate register with respect to the form and position of the pre-existing pattern of the fabric.

Such a pattern may be defined, in particular, in relation to the edges of the fabric.

Another advantage of the method according to the invention is the possibility of combining some steps with traditional printing, for example using printing screens. In fact, such a combination makes it possible to obtain special interesting esthetic effects.

Continuous adaptation to the patterns figured in the fabric makes it possible to take into account, on the one hand, the actual positionings of said patterns and, on the other hand, possible deformations or distortions of said patterns attributable, for example, to manufacturing defects or to mounting faults on the means for the movement of the fabric. The fabric may, for example, be locally tensioned to a greater or lesser extent in relation to the movement members, thus generating an offset or a deformation of one or more patterns.

Another unexpected advantage of the method according to the invention is that it is free of the limitations imposed by a pre-recorded and unchangeable reference model or pattern.

In fact, this reference pattern may, according to the invention, be processed or adapted in such a way as to be identified as closely as possible with the actual pattern read and recognized on the fabric. In contrast to screen printing and cylinder printing, the image to be printed is thus constructed completely or partially as the fabric moves past in front of the camera. During this construction, the pre-recorded pattern is used, which is converted by displacement and/or deformation so as to be superposed on the actual pattern figured in the fabric.

According to the invention, preferably, the fabric is moved in relation to an identification means and to a printing means at a speed compatible with the identification speed and the printing speed.

According to the invention, preferably, printing is adapted in line by means of the virtually instantaneous recognition of different pre-existing patterns capable of succeeding one another or alternating with one another on the fabric.

The method according to the invention makes it possible to print patterns in situations where traditional screen or cylinder printing does not afford sufficient accuracy with respect to a pre-existing pattern on the fabric.

As an example, even if the fabric is tensioned so as to deform the patterns which are figured on it (jacquard fabric), these deformed patterns are recognized and accurately overprinted. When the fabric is subsequently relaxed, the figured patterns resume their initial form which will remain correctly printed. There will be no offset between the figured patterns and the printed patterns corresponding to all the reference patterns.

BRIEF DESCRIPTION OF THE DRAWINGS

Other characteristics and advantages will be gathered from a reading of the detailed description given below by way of non limiting example, with reference to the drawings in which:

FIG. 2 shows diagrammatically an example of printing equipment or a printing installation according to the invention;

FIGS. 3 to 12 show examples of printing by the method according to the invention.

DETAILED DESCRIPTION OF THE INVENTION

Figure 1:
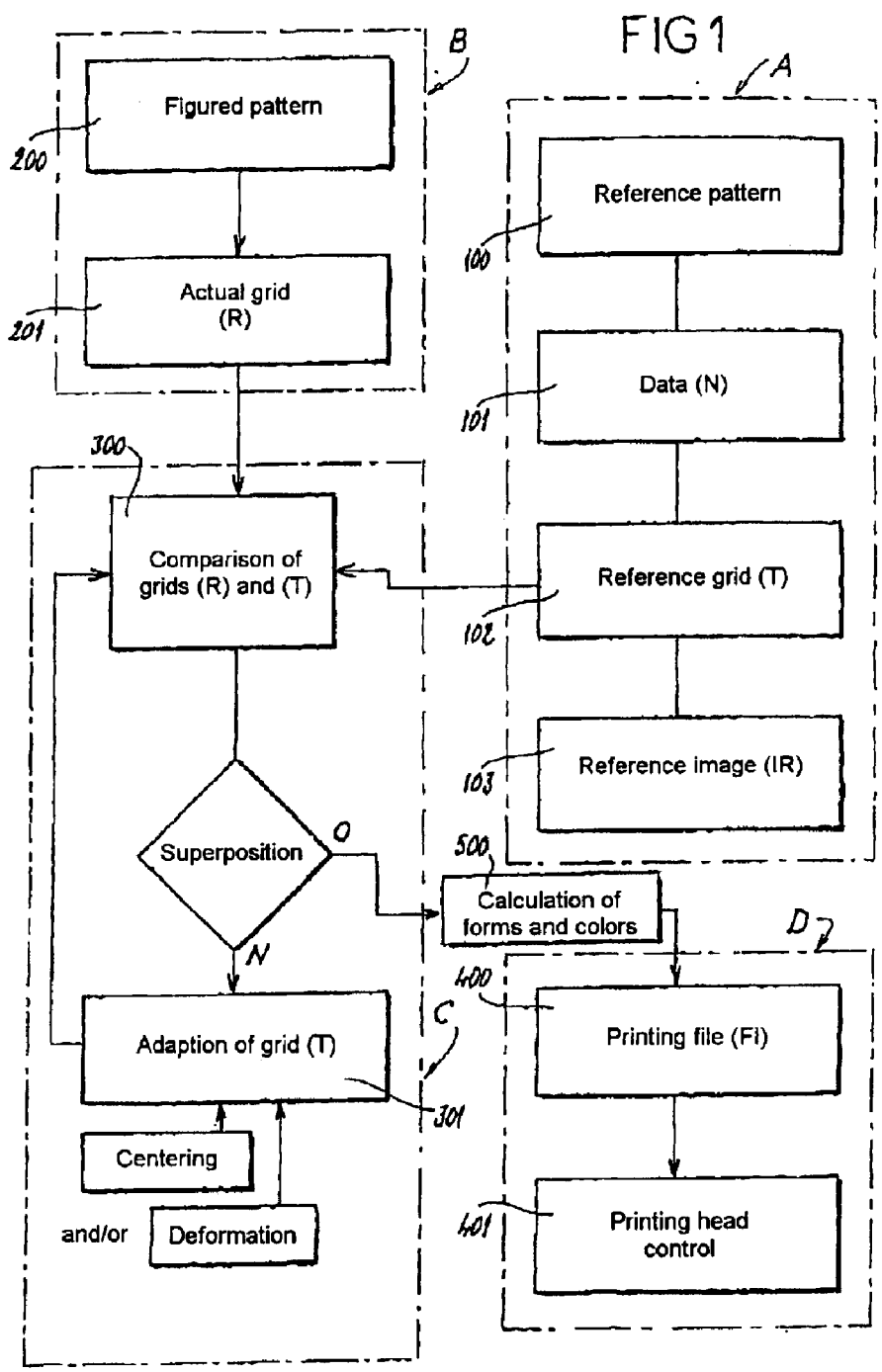
FIG. 1 shows a flow chart of the steps of the method according to the invention.

FIG. 1 shows a diagrammatic flow chart of the steps of the method according to the invention.

According to this method, one or more patterns are recorded with the aid of an image acquisition means of the camera type, connected to a computer. The computer, with the aid of a suitable program, therefore makes it possible to acquire 100 a reference pattern in numerical form by image recognition and to record 101 the corresponding data N. These data N subsequently allow the computer to generate 102 a reference grid T comprising characteristic dots defining the geometry of the reference pattern. The reference image IR corresponding to the grid (T) is recorded 103. The latter may advantageously be displayed on a screen. Steps 101 to 103 above correspond to a learning phase (A) in respect of the reference pattern.

In the method according to the invention, one or more patterns are subsequently identified in a fabric, and also their position, with the aid of a camera connected to the computer, so as to identify by image recognition a set of actual characteristic dots for each pattern, and thereby to generate 201 an actual grid (R) of actual characteristic dots.

This actual grid (R) constitutes the actual architecture of the pattern or patterns of the fabric. These steps 200 and 201 thus represent an identification phase (B) in respect of each pattern by the method according to the invention.

The latter also comprises a comparison and adaption phase (C), in which the identified patterns are compared with the reference patterns for recognition purposes.

Once the identified pattern has been recognized, the reference pattern is adapted by means of the computer so as to superpose it on the identified pattern. These steps involve, on the one hand, comparing 300 the actual grid (R) with the reference grid (T), so as to determine the distance between each reference characteristic dot and each corresponding actual characteristic dot.

According to the method, an adaptation 301 of the reference grid (T) is subsequently carried out, by said reference grid (T) being deformed and/or centered in order to superpose it on the actual grid (R) of the fabric.

What is known as the deformation method involves taking as a reference the actual grid of the fabric and positioning the print in relation to the actual position of a figured pattern on the moving fabric.

By "figured pattern" is meant any design, decoration or inscription, colored or not, obtained in an integrated manner in the fabric, for example during weaving, or obtained in an applied manner, for example by printing according to any technique suitable for a textile piece.

The method of deformation processing involves, for example, deforming the reference grid (T) by a second-order interpolation. The program loaded in the computer and comprising instructions for recalculating the position of the characteristic dots defining the reference grid is known per se.

What is known as the method of processing by centering involves taking as an identified pattern the edges of the moving fabric and positioning the print in relation to said edges. This method may be considered as a simplified deformation method.

Another processing method may involve a combination of the centering method and of the deformation method for the reference grid (T). The adaptation of the reference grid (T) thus corresponds to a method of processing by the centering and/or the deformation of the reference grid (T).

What is known as a combined processing method involves, for example, dividing a printing zone of the fabric into a plurality of parts to which the operator assigns a processing method. Some parts of the reference image (IR) can thus be centered, while other parts of this same reference image (IR) may be deformed.

To obtain particular esthetic effects, it is advantageous to prefer one or other of these three processing methods.

After the comparison step 300 in respect of the grids (R) and (T) and, if appropriate, the adaptation step 301 in respect of the reference grid (T), a superposition of the actual grid (R) and of the reference grid (T) is obtained. This superposition makes it possible to pass to a printing phase (D), in which a printing file (FI) is generated 400 in pixels from the reference grid (T) adapted or not.

This printing file (FI) subsequently makes it possible to control 401 a printing head of the printer and consequently to position said printing head on the fabric.

This printing phase (D) may, where appropriate, also be obtained without the adaptation of the reference grid (T), when the reference grid (T) and the actual grid (R) are already superposed during the comparison step in respect of the grids (R) and (T).

The printing file (FI) comprises, where appropriate, data relating to a method for processing by centering, to a method of processing by deformation or to a combination of said methods.

According to the invention, the printing method involves dividing the image to be printed into different zones, assigning a processing method to each zone and hierarchizing the printing of the various zones, so as to print said zones in a defined order, this generally being carried out in one printing operation.

The printing method makes it possible, for example, to apply and superpose different layers of coloration on the same fabric portion. This portion comprises, for example, a partial overlap of printing zones which are assigned respectively different processing methods.

The order or relative priority of the printing of such zones is determined and calculated as a function of the desired final result, for example of the desired esthetic effect and, if appropriate, of the adaptation operation or operations which have been undertaken. Printing may take account, for example, of a special form and/or a superposition of different colorations. When there is superposition, it is the last printing layer which predominates and conceals the other layers.

According to the invention, printing is obtained by ink jet.

According to the invention, the method also involves recalculating the color of the pixels of the printing file by means of the computer, starting from the recorded pixels of the reference pattern, and taking into account the method of adaptation of the reference grid. The modification in the position of the characteristic reference dots in order to allow for the change in form of the figured pattern in relation to the reference pattern likewise takes the form of a new calculation of each pixel. It is thus possible to reconstruct an image which is faithful to the reference pattern but the form of which takes account of that of the figured pattern.

This step likewise corresponds to a complementary adaptation 500 of the reference grid (T), said adaptation being indicated diagrammatically in FIG. 1 and being appropriate to implement after the comparison and adaption phase (C).

The invention also relates to a "computer program" product loadable directly into an internal memory of a computer. This "computer program" product thus comprises software code portions for executing the steps of the method according to the invention, described above with reference to FIG. 1, when said program is executed on a computer (not shown).

FIG. 2 shows diagrammatically an exemplary embodiment of a printing assembly or printing equipment for carrying out the printing method according to the invention. The printing assembly comprises a support and movement means 3 making it possible to support and move the fabric 2. This means is known per se. The printing assembly comprises a camera 4 for identifying the patterns figured on the fabric 2. A lighting device 6 is also provided. The direction of movement of the fabric 2 is indicated diagrammatically by the arrow (F).

A computer, the internal memory of which is loaded with a program making it possible to execute the steps of the method described with reference to FIG. 1, is identified in FIG. 2 under the reference 50.

The computer 50 is connected to the camera 4 and stores and modifies, where appropriate, and as above, the data N relating to the reference pattern, and the printer 81 comprises at least one head 8 for printing dot by dot, controlled by a printing file (FI) generated by the computer 50.

According to one embodiment, the printing assembly comprises a coding means 10 connected to the computer 50 and making it possible to identify and measure the advance of the fabric on its support and to trigger the acquisition of the figured patterns by the camera 4.

The printing assembly operates, for example, by printing successive strips on the fabric 2 moving past at defined rates of advance. The acquisition of data relating to the identification (recognition and position) of the figured patterns by the camera 4 likewise, in this case, takes place according to such rates of advance.

Thus, the fabric 2 advances at a defined rate orthogonally to the direction of displacement of a printing head. This movement of the fabric 2 is subsequently interrupted for the time necessary for printing a corresponding strip of the fabric 2.

The camera 4 is associated with the lighting device 6 consisting, for example, of light-emitting diodes or of high-frequency neon lights. The lighting is preferably glancing in relation to the fabric 2, in order to emphasize more the contrast of the figured patterns in relation to the rest of the fabric.

The computer program controlling the printing method recognizes the variations in contrast in order to determine the form or contour of an identified figured pattern, this being for purposes of recognition among the pre-recorded reference patterns. The program therefore searches for the characteristic dots of the figured pattern by means of a conventional form recognition method. The latter involves identifying all the forms of a given pattern, the respective centers of gravity of which would be the characteristic dots of said pattern. Numerous forms can be detected, making this identification particularly accurate. The set of characteristic points of the identified figured pattern thus constitutes a frame, referred to above as the actual grid.

FIGS. 3 and 4 show an example of the implementation of the printing method according to the invention, in which the method of processing a pattern by centering is used.

The edges 2a and 2b of the fabric 2 are thus identified, and the centering of a reference pattern 20 in relation to these edges 2a, 2b is carried out. The fabric 2 is then obtained, provided with its pattern 20 printed in a centered manner (cf. FIG. 4). The data (N) are modified only if the centering of the reference pattern 20 in relation to the edges 2a, 2b proves necessary.

Figure 5:
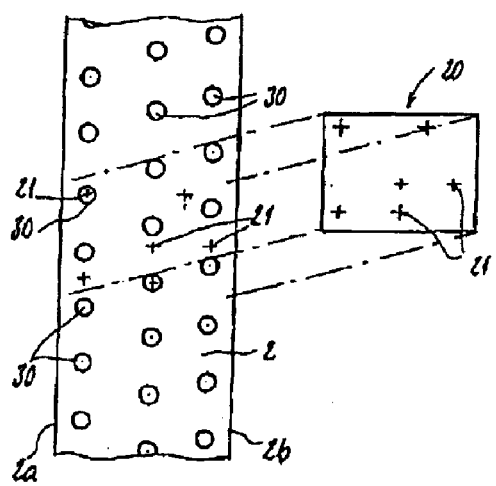
Figure 6:
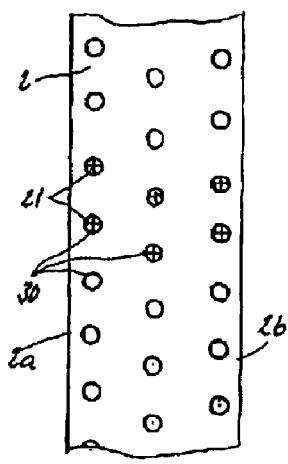

FIGS. 5 and 6 show another example of the implementation of the printing method according to the invention, in which the method of processing a pattern by deformation is used.

By means of the computer, the position of the actual characteristic dots 30 is compared in real time with the position of the reference characteristic dots 21 of the reference pattern 20. It can thus be checked whether the actual (R) and reference (T) grids are superposed. In the example of FIG. 5 this is not so, and it can be seen that all the reference characteristic dots 21 projected onto the fabric 2 are not superposed on the actual characteristic dots 30.

The computer then determines a new position by a calculation for particular reference characteristic dots 21, so as to superpose them on the corresponding actual characteristic dots 30.

The reference grid (T) is thus deformed in real time in order to generate the printing file (FI).

After this operation, the reference grid (T) and the actual grid (R) are merged, and a deformed reference image (IR) is provided, which can be printed with high accuracy onto the figured pattern identified on the fabric 2, as may be seen in FIG. 6.

Figure 7:
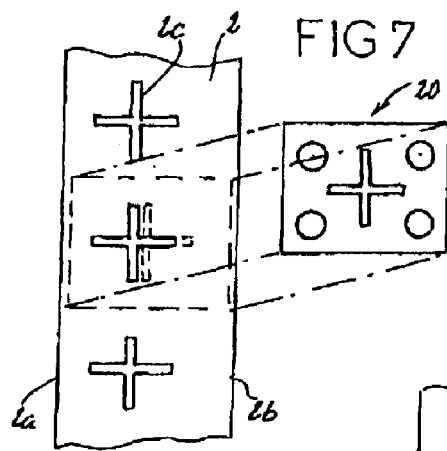
Figure 8:
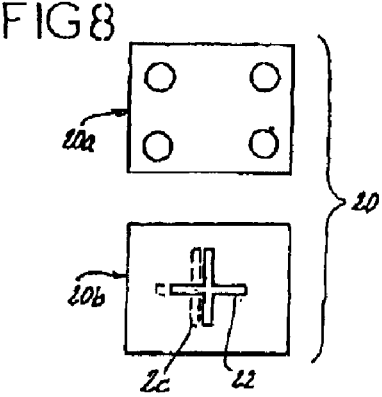
Figure 9:
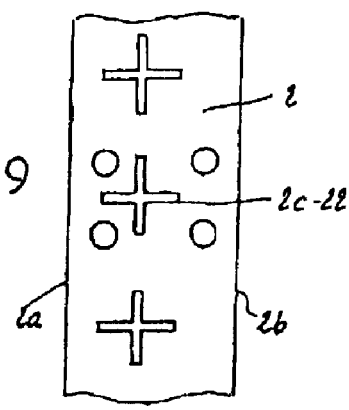

FIGS. 7 to 9 show an additional example of the implementation of the printing method according to the invention, in which the combined processing method (centering and deformation) is used, with examples of the form of the reference patterns 20 and of figured patterns 2c in the fabric 2.

The reference pattern 20 consists of a first reference pattern 20a which is centered in relation to the edges 2a, 2b, without undergoing deformation. The reference pattern 20 also consists of a second reference pattern 20b which is adapted according to deformation processing in order to be superposed on the figured patterns 2c. The second reference pattern 20b comprises an element 22 which is very clearly offset in relation to the figured pattern 2c. This offset is indicated by broken lines in FIG. 8. The adaptation step of the second reference pattern 20b consequently makes it possible to deform the element 22 so that the printing zone which it defines is superposed on the figured pattern 2c. Printing is subsequently undertaken on the basis of the printing file (FI) comprising modified data (N) relating to the two processing methods. The printed fabric 2 of FIG. 9 is thus obtained.

FIGS. 10, 11 and 12 show by way of example an alternative implementation of the method according to the invention. This method is supplemented in relation to the example described is FIGS. 7 to 9, in as much as it makes it possible to hierarchize the printing of various zones.

In fact, the first reference pattern 20a which is centered in relation to the edges 2a, 2b comprises an additional design 23.

The second reference pattern 20b is adapted by deformation processing according to the corresponding description of FIGS. 7 to 9.

According to the invention, the data originating, on the one hand, from the recorded reference patterns and, on the other hand, from the identified figured patterns are taken into account in order to define two printing zones corresponding respectively to the first and second reference patterns 20a, 20b.

Hierarchization involves the priority printing of the printing zone corresponding to the method of centering processing and, subsequently, printing the printing zone corresponding to the method of deformation processing.

The element 22 is thus obtained, which is merged with the figured pattern 2c which is printed completely and the form of which partially conceals the additional design 23. The reference pattern 20 is therefore restored to the best possible extent, in view of the positioning of the figured patterns 2c in the fabric 2.

As an example, the method according to the invention makes it possible to generate original designs, the graphics of which are closely linked to the weaving. A printing accuracy of below 0.2 mm is obtained. It is possible, for example, to print a rider on a horse woven in the fabric 2. A perfect register of all the details is obtained. Superposable and/or complementary images are thus obtained, in order to form the final pattern on the fabric.

The method according to the invention can employ traditional flat-screen printing on the basis of the data from the printing file (FI). In this case, a control file is generated, capable of controlling a machine for the manufacture of printing screens or masks.

The printing adopted according to the invention can combine an ink-jet method and a traditional method, for example with a flat screen. The advantages of the two methods can then be added together in order to obtain novel and original graphic effects.

The printing assembly according to the invention may also be used as a simple device for centering the fabric 2 and advantageously replace heavy mechanical centering methods.

What is claimed is:

1. A printing method for printing a flat substrate comprising pre-existing patterns prior to printing, for example a fabric, comprising:

pre-recording at least one reference pattern numerically;

continuously or discontinuously identifying at least one pattern of a fabric by relative displacement between a portion of said fabric and an image acquisition means;

comparing the identified pattern in real time with the reference pattern pre-recorded for recognition purposes;

adapting the pre-recorded reference pattern in line, in order to superpose it on and/or fit it to the identified pattern and generating a printing file (FI), taking into account, where appropriate, the adaptation of the reference pattern to the identified pattern;

and carrying out printing dot by dot on said portion of the fabric, for example of an image, a design or colors, directly or indirectly, according to the printing file.

2. The printing method as claimed in claim 1, wherein a centering method is adopted, which comprises taking as the identified pattern the edges of the substrate moving past and positioning the print in relation to said edges.

3. The printing method as claimed in claim 2, further comprising dividing a printing zone of the substrate into at least two parts, one being printed according to the centering method and the other being printed according to a deformation method, and generating at least one corresponding printing file (FI).

4. The printing method as claimed in claim 2, further comprising recalculating the color of the pixels of the printing zone, starting from the pixels of the reference pattern and, where appropriate, taking into account the printing method used.

5. The printing method according to claim 1, wherein a deformation method is adopted, which comprises taking as the identified pattern, a figured pattern of the substrate and positioning the print in relation to the identified figured pattern.

6. The printing method as claimed in claim 3, further comprising:
dividing the image to be printed into different zones;
assigning a processing method to each zone;
and hierarchizing the printing of the different zones so as to print said zones in a defined order.

7. The printing method as claimed in claim 1, further comprising carrying out the printing dot by dot by means of an ink jet, the position of which is controlled on the basis of the printing file.

8. The printing method as claimed in claim 1, further comprising:
identifying a figured pattern on the substrate;
defining characteristic dots defining the form of said pattern, and forming an actual grid (R);
comparing this actual grid (R) with a pre-recorded theoretical grid (T) of reference characteristic dots, so as to determine the distance between each reference characteristic dot and the corresponding actual characteristic dot;
and deforming and/or centering the pre-recorded reference grid (T) in order to superpose it on the actual grid (R) of the fabric, said recorded and deformed grid (T) serving for generating the printing file (FI).

9. The printing method as claimed in claim 8, further comprising deforming the pre-recorded reference grid (T) by nonlinear interpolation.

10. The printing method as claimed in claim 1, further comprising moving the substrate in relation to an identification means and to a printing means at a speed compatible with the identification speed and the printing speed.

11. The printing method as claimed in claim 1, further comprising using at least part of the data relating to the identified pattern in order to generate a control file capable of controlling a machine for the manufacture of printing screens or masks.

12. The printing method as claimed in claim 1, wherein the method employs a computer controlled by a "computer program" product loadable directly into the internal memory of said computer and comprising software code portions for executing the steps of said method.

13. A "computer program" product loadable directly into the internal memory of a computer, comprising software code portions for executing the steps of the method as claimed in claim 1, when said program is executed on said computer.

14. The printing method as claimed in claim 1, wherein where appropriate, processing the reference pattern thus pre-recorded.

15. An assembly for printing on a substrate comprising pre-existing patterns prior to printing, comprising:
a camera for recording a reference pattern;
a computer connected to said camera, in order to store and, where appropriate, modify data (N) relating to the reference pattern;
and a printing system, of which at least one head for printing dot by dot is controlled by a printing file (FI) generated by the computer;
a means for the support and movement of the substrate;
analysis means in order, on the one hand, to compare a pre-recorded reference pattern in real time with a pattern identified on the substrate and, on the other hand, to adapt or not the data (N) relating to the reference pattern as a function of the result of the comparison;
and means for generating a printing file (FI) from the data (N) modified or not.

16. The printing assembly as claimed in claim 15, wherein the analysis means and the means for generating a printing file are integrated in or loaded into the computer.

17. The assembly for printing on a substrate as claimed in claim 15, further comprising a coding means connected to the computer and making it possible to detect the advance of the substrate of its support and to trigger the acquisition of the identified pattern by the camera.

18. A printing method for printing a moving substrate comprising pre-existing patterns prior to printing, for example a fabric, comprising:
pre-recording at least one pattern numerically;
where appropriate, processing the pattern thus pre-recorded;
generating a printing file (FI) comprising data relating to the pre-recorded and/or processed pattern;
identifying at least one pattern of a portion of the substrate by relative displacement between said fabric and an image acquisition means;
comparing the identified pattern in real time with the reference pattern pre-recorded for recognition purposes;
adapting the pre-recorded reference pattern in line with the moving substrate, in order to superpose it on and/or fit it to the identified pattern and generating a printing file (FI);
and carrying out printing for example of an image, a design or colors, dot by dot, —according to the printing file on said portion of the fabric.

19. An assembly for printing on a moving substrate comprising pre-existing patterns prior to printing, comprising:
a camera for recording a reference pattern;
a computer connected to said camera, in order to store and, where appropriate, modify data (N) relating to the reference pattern;
and a printing system, of which at least one head for printing dot by dot is controlled by a printing file (FI) generated by the computer;
a means for the support and movement of the substrate;

analysis means in order, on the one hand, to compare a pre-recorded reference pattern in real time with a pattern identified on a portion of the substrate and, on the other hand, to adapt or not the data (N) relating to the reference pattern as a function of the result of the comparison;

means for generating a printing file (FI) from the data (N) modified or not;

comparing the identified pattern in real time with the reference pattern pre-recorded for recognition purposes;

adapting the pre-recorded reference pattern in line, in order to superpose it on and/or fit it to the identified pattern and generating a printing file (FI);

and carrying out printing dot by dot, directly or indirectly, according to the printing file, on said portion of the substrate.

20. A printing method for printing a flat substrate comprising pre-existing patterns prior to printing, for example a fabric, comprising:

continuously or discontinuously identifying at least one pattern of a fabric by relative displacement between a portion of said fabric and an image acquisition means;

comparing the identified pattern in real time with a reference pattern for recognition purposes;

adapting the reference pattern in line, in order to superpose it on and/or fit it to the identified pattern and generating a printing file (FI), taking into account, where appropriate, the adaptation of the reference pattern to the identified pattern; and carrying out printing dot by dot on said portion of the fabric, for example of an image, a design or colors, directly or indirectly, according to the printing file.

* * * * *